(12) United States Patent  
Nilsson

(10) Patent No.: US 11,312,101 B2  
(45) Date of Patent: Apr. 26, 2022

(54) COMPOSITE MATERIAL AND METHOD FOR PRODUCTION OF THE SAME

(71) Applicant: LAMERA AB, Västra Frölunda (SE)

(72) Inventor: Bengt Nilsson, Hisings Backa (SE)

(73) Assignee: LAMERA AB, Västra Frölunda (SE)

( * ) Notice: Subject to any disclaimer, the term of this patent is extended or adjusted under 35 U.S.C. 154(b) by 222 days.

(21) Appl. No.: 16/494,444

(22) PCT Filed: Mar. 16, 2018

(86) PCT No.: PCT/SE2018/050263  
§ 371 (c)(1),  
(2) Date: Sep. 16, 2019

(87) PCT Pub. No.: WO2018/169482  
PCT Pub. Date: Sep. 20, 2018

(65) Prior Publication Data  
US 2020/0086607 A1    Mar. 19, 2020

(30) Foreign Application Priority Data  
Mar. 17, 2017 (SE) .................... 1750323-6

(51) Int. Cl.  
*B32B 5/02* (2006.01)  
*B32B 1/02* (2006.01)  
(Continued)

(52) U.S. Cl.  
CPC .................. *B32B 5/02* (2013.01); *B32B 1/02* (2013.01); *B32B 3/02* (2013.01); *B32B 7/12* (2013.01);  
(Continued)

(58) Field of Classification Search  
CPC .... B32B 1/02; B32B 3/02; B32B 5/02; B32B 5/12; B32B 7/12; B32B 37/12;  
(Continued)

(56) References Cited

U.S. PATENT DOCUMENTS 2,276,374 A    3/1942    Derman

FOREIGN PATENT DOCUMENTS

CA    2480689 C    6/2015  
DE    10214010 A1    10/2003  
(Continued)

OTHER PUBLICATIONS

Swedish Search Report in corresponding Swedish Application No. 1750323-6 dated Oct. 30, 2017 (3 pages).  
(Continued)

*Primary Examiner* — Walter Aughenbaugh  
(74) *Attorney, Agent, or Firm* — Jeffri A. Kaminski; Venable LLP

(57) ABSTRACT

A composite material is described. The composite material comprises a first cover sheet, a second cover sheet, and a core layer arranged between the first cover sheet and the second cover sheet, said core layer comprising a first adhesive layer in contact with the first cover sheet, a second adhesive layer in contact with the second cover sheet, and fibres which extend from the first adhesive layer to the second adhesive layer. The first cover sheet has a larger extension than the core layer and comprises at least a first edge region which is free from the core layer, wherein the first edge region extends from the outer edge of the first cover sheet to the core layer.

12 Claims, 5 Drawing Sheets

(51) Int. Cl.
*B32B 3/02* (2006.01)
*B32B 7/12* (2006.01)
*B32B 37/12* (2006.01)
*B32B 37/24* (2006.01)
*B65D 65/40* (2006.01)

(52) U.S. Cl.
CPC .............. *B32B 37/12* (2013.01); *B32B 37/24* (2013.01); *B65D 65/40* (2013.01); *B32B 2037/243* (2013.01); *B32B 2307/546* (2013.01); *B32B 2439/00* (2013.01)

(58) Field of Classification Search
CPC .............. B32B 37/24; B32B 2037/243; B32B 2307/546; B32B 2439/00; B65D 65/40
See application file for complete search history.

(56) References Cited

FOREIGN PATENT DOCUMENTS

| | | |
|---|---|---|
| DE | 102014116112 A1 | 5/2016 |
| EP | 0 333 685 A2 | 9/1989 |
| EP | 0912336 B1 | 3/2005 |
| EP | 3272514 A1 | 1/2018 |
| WO | 9801295 A1 | 1/1998 |
| WO | 0176864 A2 | 10/2001 |
| WO | 2004098820 A1 | 11/2004 |
| WO | 2004098886 A1 | 11/2004 |
| WO | 2013156166 A1 | 10/2013 |
| WO | 2016148549 A1 | 9/2016 |
| WO | 2017003377 A1 | 1/2017 |

OTHER PUBLICATIONS

International Search Report and Written Opinion in corresponding International Application No. PCT/SE2018/050263 dated May 17, 2018 (10 pages).

COMPOSITE MATERIAL AND METHOD FOR PRODUCTION OF THE SAME

CROSS-REFERENCE TO RELATED APPLICATIONS

This application is a U.S. National Stage application of PCT/SE2018/050263, filed Mar. 16, 2018 and published on Sep. 20, 2018 as WO/2018/169482, which claims the benefit of Swedish Patent Application No. 1750323-6, filed Mar. 17, 2017, all of which are hereby incorporated by reference in their entireties.

TECHNICAL FIELD

The present invention relates to a composite material, and a method for production of the composite material. More specifically the present invention relates to a composite material comprising a first cover sheet, a second cover sheet and a core layer arranged between the first cover sheet and the second cover sheet. The core layer comprises a first adhesive layer in contact with the first cover sheet, a second adhesive layer in contact with the second cover sheet and a flocking material in the form of individual fibres which extend from the first adhesive layer to the second adhesive layer.

DESCRIPTION OF THE PRIOR ART

Composite materials comprising a first cover sheet, a second cover sheet and a core layer arranged between the first cover sheet and the second cover sheet.

WO2013156166 describes a method for producing large lightweight sheet metal which is composed of layers from at least two metallic cover layers and at least one non-metallic core layer.

The core layer may comprise a first adhesive layer in contact with the first cover sheet, a second adhesive layer in contact with the second cover sheet and a flocking material in the form of individual fibres which extend from the first adhesive layer to the second adhesive layer. Such a composite material can attain numerous advantages over solid materials with the same dimensions. By way of example, a high bending stiffness, a good formability, a good flexibility and/or a high mechanical or acoustic energy absorption can be obtained, while keeping the weight of the composite material low. The desired properties to be optimized can be chosen by the type, shape, density, thickness, length and alignment of the fibres in the core layer. The core layer in such composite materials comprises a first adhesive layer in contact with the first cover sheet, a second adhesive layer in contact with the second cover sheet and fibres which extend from the first adhesive layer to the second adhesive layer.

EP0333685 describes a sandwich construction and a method for the production thereof. The sandwich construction comprises two plates or sheets having a material in between which has been applied through electrostatic deposition, so called flocking. The material that is applied by flocking is electrically non-conducting material such as nylon fibres.

WO9801295 describes a sandwich structure which is resistant to higher temperatures than the material in EP0333685 due to the use of metallic fibres in place of the nylon fibres of EP0333685.

WO 2004/098886 describes work pieces from composite layer structures and methods for their manufacture.

SUMMARY OF THE INVENTION

An object of the present invention is to provide a composite material of the type having a core layer comprising a flocking material in the form of individual fibres and a method of production of such a material, which composite material is an alternative to the composite materials of the prior art.

A further object of the present invention is to provide a composite material of the type having a core layer comprising a flocking material in the form of individual fibres and a method for production of such a material, which composite material is more easily formed by pressing compared to the composite materials of the prior art.

These objects are achieved with a composite material and a method according to the independent claims.

Additional advantages of the invention are provided with the features in the dependent claims.

According to a first aspect of the present invention a composite material is provided. The composite material comprises a first cover sheet, a second cover sheet, and a core layer arranged between the first cover sheet and the second cover sheet, said core layer comprising a first adhesive layer in contact with the first cover sheet, a second adhesive layer in contact with the second cover sheet, and a flocking material in the form of individual fibres which extend from the first adhesive layer to the second adhesive layer. The composite material is characterized in that the first cover sheet has a larger extension than the core layer and comprises at least a first edge region which is free from the core layer, wherein the first edge region extends from the outer edge of the first cover sheet to the core layer. The extension of the first edge region beyond an outer edge of the core layer is at least 20 mm and the second cover sheet extends no more than 5 mm beyond the outer edge of the core layer.

By extension from the outer edge of the core layer is meant extension perpendicular to the edge of the core layer. Also, said extension is the maximum extension of the first edge region. The edge region may have a smaller extension in some areas.

The first edge region may be formed in the same way as a cover sheet without any core layer. As the second cover sheet has a small extension the cover sheets do not have to be attached to each other. The extension of the first edge region as specified above is advantageous to be able to form the edge region into desired shapes of a finished product such as, e.g., side walls of a container.

Preferably, the composite material has only two cover sheets, i.e., the composite material comprises no cover sheets in addition to the first cover sheet and the second cover sheet.

Composite materials as those described in WO9801295 and EP0333685 are lightweight materials with a high flexural rigidity compared to traditional materials of the same weight. The composite materials described in WO9801295 and EP0333685 also have plastic formability. However, the technique for forming such composite materials is somewhat different from the techniques used for forming sheet metal.

A composite material according to the first aspect has a high flexural rigidity within the area of the core layer. The areas of the first cover sheet not covered by the core layer may be formed using traditional techniques for forming such cover sheets.

Preferably, the cover sheets are metal sheets, but it is possible to use other materials for the cover sheets. When using metal sheets as cover sheets common techniques used for forming metal sheets may be employed for the forming of the edge region. This, makes it easier for a user of the composite material to form the material according to desires of the user. The composite material according to the first aspect is thus especially useful when the area of the composite material covered by the core layer is to be flat in the final product. An example of such a product is a drawer. The side walls of a drawer are primarily subject to tensile stress while the bottom of the drawer is subject to flexural stress. Thus, the side walls do not need to have the same flexural strength as the bottom.

Another example of a product that may be fabricated with a composite material according to the invention is a wall panel for the façade of a building. In such a case the area of composite material covered by the core layer preferably forms the main area of the panel while the first edge region may be used for attachment of the panel to the building.

In a composite material, according to the first aspect, the thickness of the cover sheets may be in the range 0.05-2 mm. This range is preferable in that it provides a low weight of the composite material and gains a lot of flexural strength from the core layer.

The thickness of the core layer is preferably in the range of 0.2-6 mm. Such a thickness provides a high flexural strength to the composite material.

The extension of the first edge region from the core layer may be at least 50 mm. Such an extension of the first edge region is advantageous to be able to form the first edge region into, e.g., side walls.

The first edge region may extend around the entire outer edge of the first cover sheet, so that the first edge region encircles the core layer. This is advantageous if the composite is to be formed into a receptacle, wherein the side walls of the receptacle are to be formed from the edge region. It is of course also possible to have the edge region extending only around a part of the outer wall. Such a composite material may be useful for the production of, e.g., a shelf or other products wherein the edge regions are to be formed by using hemming or bending to connect to a shelf chassis or other structures.

The second cover sheet has essentially the same extension as the core layer. The object of the second cover sheet is to provide flexural rigidity to the composite material. Thus, any extension of the second cover sheet outside the core layer would give no contribution to the flexural rigidity of the composite material.

However, there might be other reasons for having an extension of the second cover sheet outside the core layer and to have edge regions of the second cover sheet free from the core layer. Thus, alternatively, the second cover sheet may have a larger extension than the core layer. The second edge region extends from the outer edge of the second cover sheet to the core layer. One reason for having a second edge region is that it is difficult to manufacture a composite material as described above if the core layer is to extend all the way to the outer edge of second cover sheet. If the core layer is to extend all the way to the edge of the second cover sheet adhesive material has to be applied all the way to the outer edge of the second cover sheet. At the same time, it is desirable to avoid adhesive outside the second cover sheet as adhesive on the machine used for applying adhesive may be problematic.

To provide a safety margin when applying adhesive, the composite material may be arranged so that the second cover sheet has a second edge region which extends no more than 5 mm beyond the outer edge of the core layer and preferably no more than 1 mm beyond the outer edge of the core layer.

If the adhesive may be applied with very high accuracy no edge region has to be present on the second cover sheet. However, for reasons of manufacturing it may be difficult to avoid a narrow edge region as has been explained above.

The second edge region may extend around the entire edge of the first cover sheet, so that the second edge region encircles the core layer.

The features relating to the first aspect may be combined in the same embodiment to the extent that they are not alternatives to each other.

According to a second aspect a receptacle is provided, which is formed from a composite material according to the first aspect in combination with any of the features described above. The second cover sheet may form the inner bottom of the receptacle and at least part of the edge regions may form the walls of the receptacle.

According to a third aspect of the a method is provided for production of a composite material according to the first aspect of the invention, the method comprising the steps of providing a first cover sheet and a second cover sheet, applying a first adhesive layer on the first cover sheet, and a second adhesive layer on the second cover sheet, applying a flocking material in the form of individual fibres on one of or both adhesive layers, arranging the first cover sheet adjacent to the second cover sheet with the first adhesive layer facing the second adhesive layer and with the fibres in contact with the first adhesive layer as well as the second adhesive layer, and providing for the adhesive layers to cure to form a core layer constituted by the first adhesive layer the second adhesive layer and the fibers. The method is characterized in that the first cover sheet has a larger extension than the first adhesive layer and comprises at least a first edge region which is free from the adhesive layer, wherein the first edge region extends from the outer edge of the first cover sheet to the first adhesive layer. The extension of the first edge region is at least 20 mm. The second cover sheet has essentially the same extension as the core layer and extends no more than 5 mm beyond the outer edge of the core layer.

With the method according to the third aspect a composite material according to the first aspect is provided having the advantages as described above.

The adhesive may be applied on the first cover sheet and the second cover sheet using a coating head with a which operates at a distance from the first cover sheet and the second cover sheet. By avoiding having the coating means in contact with the first cover sheet and the second cover sheet, as is normal according to the prior art, it is considerably easier to control where the adhesive is applied. The coating head is stationary while the cover sheets are moved past the coating head. The width of the cover sheets ranges from 0.2 metres to a few metres. It might be difficult to move cover sheets of such dimensions to be able to apply adhesive to the outer edge of the cover sheets without applying adhesive outside the outer edge. Thus, it is advantageous that the second cover sheet has a larger extension than the core layer.

The distance between the coating head and the cover sheet may preferably be no more than 0.2 mm more than the thickness of the adhesive.

The distance between the coating head and the cover sheet is preferable controlled with very high accuracy and preferably with a variation of no more than 0.1 mm and most preferred no more than 0.05 mm.

The coating head may comprise a slot through which the adhesive leaves the coating head and through which the adhesive is forced by applying a pressure on the adhesive inside the coating head. By applying a pressure in this way, it is possible to control the application of the adhesive precisely.

The thickness of the adhesive layer may preferably be in the range of 0.1-0.5 mm, and most preferred in the range of 0.15-0.3 mm. This has proved to provide a good result with regard to controlled stop of application of adhesive.

The application of the adhesive may be ended by the steps of moving the coating head away from the cover sheet and lowering the pressure on the adhesive inside the coating head. By lowering the pressure, the flow of adhesive from the coating head is decreased and stops completely if the pressure is lowered sufficiently.

The coating head may be moved at least 5 mm at a speed of at least 200 mm per minute. By moving the coating head away from the cover sheet, the stream of adhesive is cut of effectively.

The pressure on the adhesive in the coating head may preferably be decreased simultaneously with the movement of the coating head away from the cover sheet. The pressure is decreased at least below the ambient pressure of the coating head.

The features relating to the third aspect may be combined in the same embodiment to the extent that they are not alternatives to each other. In the following preferred embodiments of the invention will be described with reference to the appended drawings.

SHORT DESCRIPTION OF THE DRAWINGS

DESCRIPTION OF PREFERRED EMBODIMENTS

Figure 1:
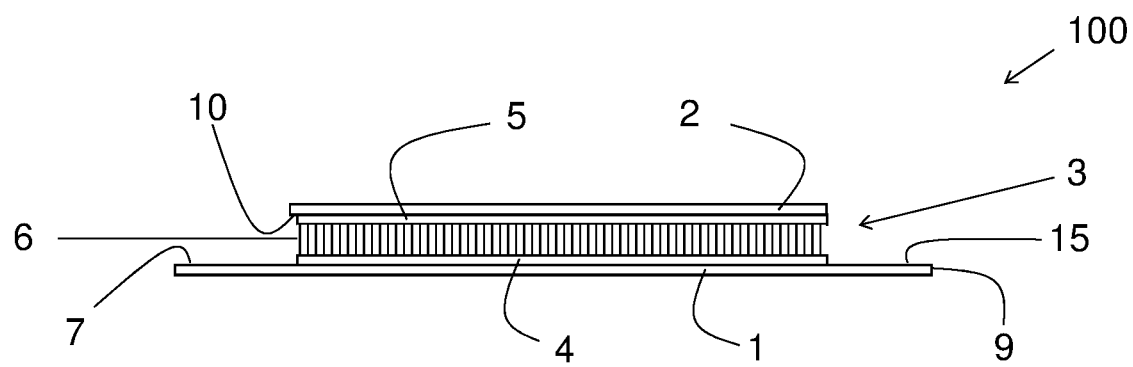
FIG. 1 shows in a side view a composite material according to a first embodiment.

In the following description of preferred embodiments, the same feature in the different drawings will be denoted with the same reference numeral. It should be noted that the drawings are not to scale.

Figure 2:
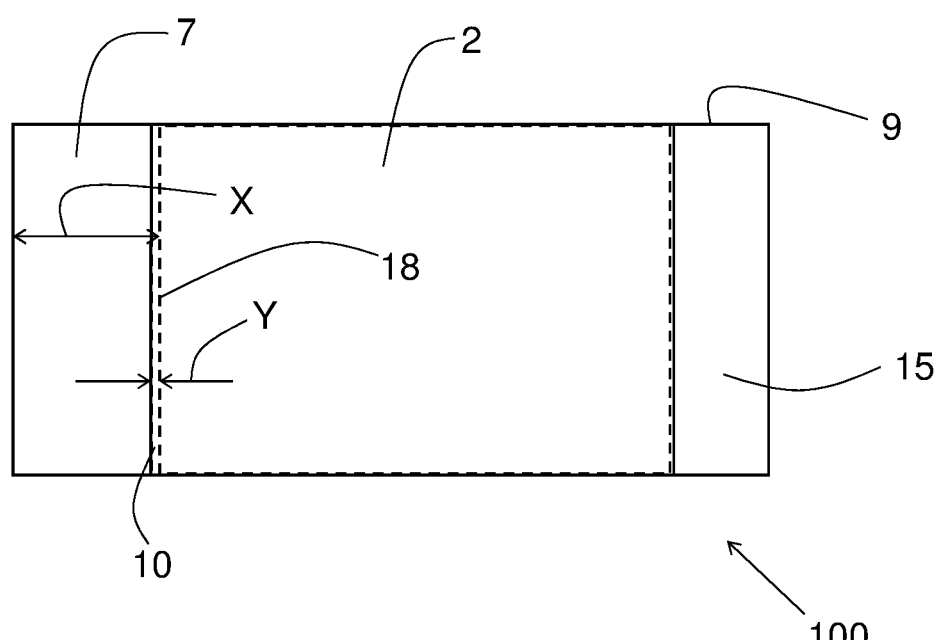
FIG. 2 shows in a top view of the composite material in FIG. 1.

FIG. 1 shows in a side view a composite material 100. FIG. 2 shows in a top view the composite material of FIG. 1. The composite material comprises a first cover sheet 1, a second cover sheet 2, and a core layer 3 arranged between the first cover sheet 1 and the second cover sheet 2. The core layer 3 comprises a first adhesive layer 4 in contact with the first cover sheet 1, a second adhesive layer 5 in contact with the second cover sheet 2, and fibres 6 which extend from the first adhesive layer 1 to the second adhesive layer 2. The first cover sheet 1 has a larger extension than the core layer 3 and comprises a first edge region 7 free from the core layer 3, wherein the first edge region 7 extends from the outer edge 9 of the first cover sheet 1 to the core layer 3. The extension, i.e. the maximum extension, of the first edge region 7 beyond the edge 18 of the core layer 3 is denoted X in FIG. 2. The maximum extension X of the first edge region 7 beyond the edge 18 of the core layer 3 is at least 20 mm. The second cover sheet 2 comprises a second edge region 10 which is opposite to the first edge region 7 of the first cover sheet 1. The second edge region 10 is free from the core layer. The second edge region 10 extends from the outer edge 9 of the second cover sheet 2 to the core layer 3. The extension, i.e. the maximum extension, of the second edge region 10 beyond the edge 18 of the core layer 3 is denoted Y in FIG. 2. As can be seen in FIG. 2 the second edge region 10 extends mainly along one side of the core layer 3 and is considerably narrower than the first edge region 7. The second cover sheet extends no more than 5 mm beyond the outer edge 18 of the core layer 3. As can be seen in FIG. 2 the core layer 3 extends almost to the edge of the first cover sheet 1 and the second cover sheet 2 along the upper and lower side in FIG. 2. The first cover sheet also comprises a third edge region 15 which extends from the outer edge 9 of the first cover sheet 1 to the core layer 3 on the opposite side of the core layer 3. The extension of the first edge region 7 perpendicular to the core layer is at least 20 mm, and preferably at least 50 mm. This allows the edge region to be formed into a side wall of a receptacle or container.

Figure 3:
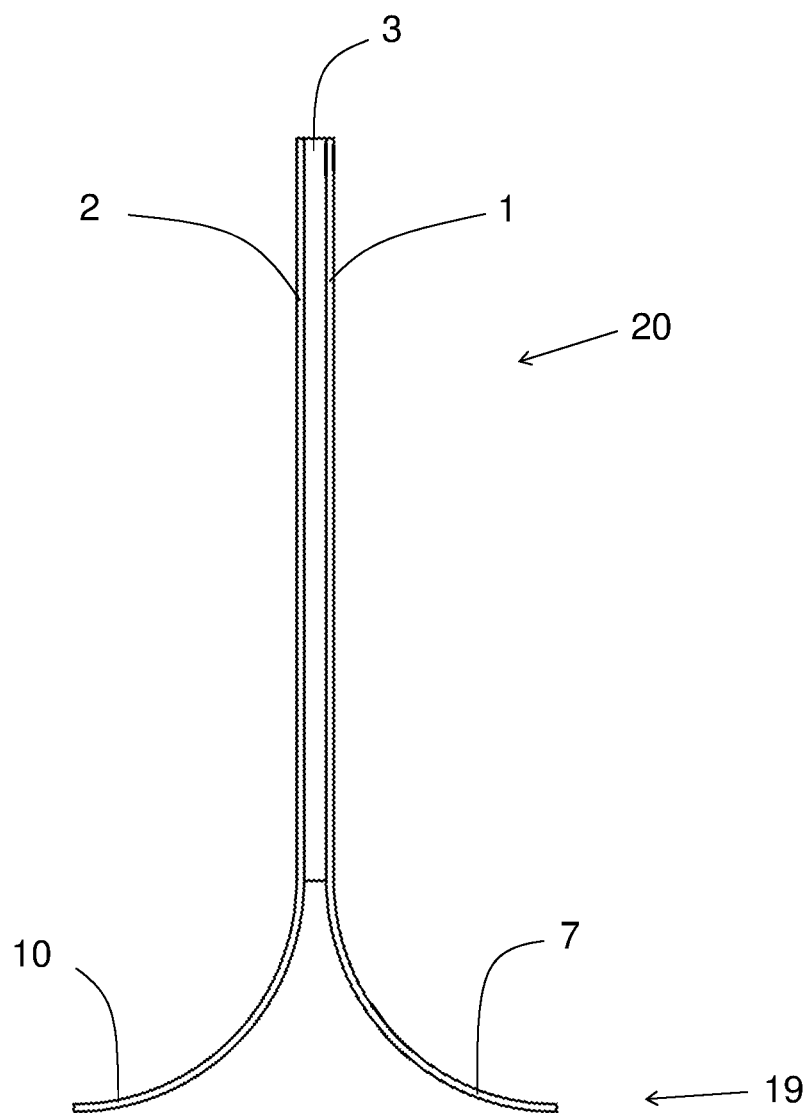
FIG. 3 shows a barrier which has been formed from a composite material.

FIG. 3 shows a barrier 20 which has been formed from a composite material similar to that shown in FIG. 1 and FIG. 2. The lower end 19 of the barrier 20 comprises the first edge region 7 and the second edge region 10. As can be seen in FIG. 3 the second edge region 10 has the same extension as the first edge region 7. As can be seen in FIG. 3 the first edge region 7 and the second edge region 10 have been bent outwards from the core layer 3 so that the ends of the first edge region 7 and the second edge region 10 provide a stable support for the barrier 20 when placed on a surface. A barrier 20 as shown in FIG. 3 may be used in many different ways. One suitable area of application is to use the barrier 20 in sports using a ball such as indoor soccer. In indoor soccer, it is desirable to keep the ball within the field using barriers 20. However, it is also desirable to play on fields which are not dedicated to soccer only. Thus, it is desirable to be able to store the barriers 20 between the different occasions when soccer is played. The barrier 20 shown in FIG. 3 is very lightweight while at the same time providing sufficient strength for the barrier 20. The low weight ensures easy handling of the barriers 20.

Figure 4:
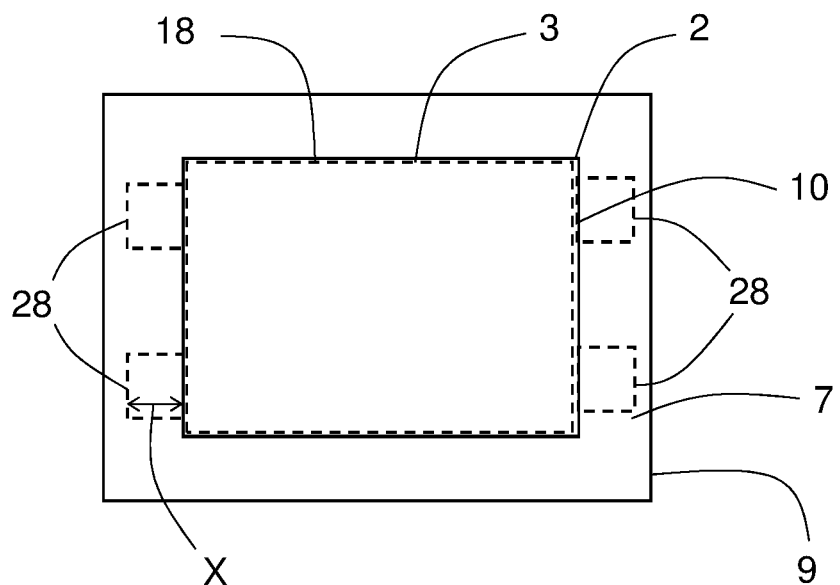
FIG. 4 shows in a top view a composite material according to an embodiment of the invention.
Figure 5:
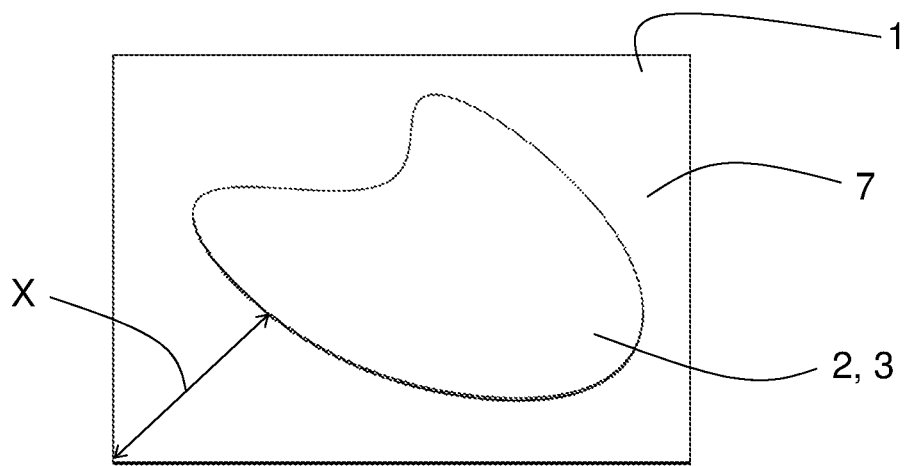
FIG. 5 shows in a top view a composite material according to a different embodiment of the invention.
Figure 6:
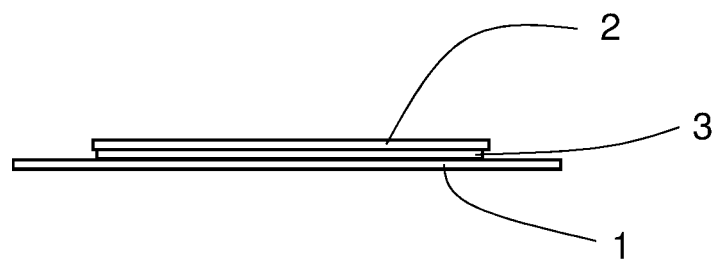
FIG. 6 shows the composite material of FIGS. 4 and 5 in a side view.

FIG. 4 shows in a top view a different embodiment of a composite material comprising a first cover sheet 1 and a second cover sheet 2 and a core layer 3 arranged between the first cover sheet 1 and the second cover sheet 2. FIG. 5 shows in a top view a different embodiment of a composite material comprising a first cover sheet 1 and a second cover sheet 2 and a core layer 3 arranged between the first cover sheet 1 and the second cover sheet 2. The second cover sheet 2 and the core layer 3 have a rectangular shape in FIG. 4. FIG. 6 shows the composite material of FIGS. 4 and 5 in a side view. The first cover sheet 1 has a larger extension than the core layer 3 and comprises a first edge region 7 free from the core layer 3. The first edge region 7 extends from the outer edge 9 of the first cover sheet 1 to the core layer 3 and extends around the entire outer edge 9 of the first cover sheet 1, so that the first edge region 7 encircles the core layer 3. As can be seen most clearly in FIG. 5, the second cover sheet 2 has essentially the same extension as the core layer 3. The second cover sheet 2 comprises a narrow second edge region 10 which is free from the core layer 3. The second cover sheet extends no more than 5 mm beyond the outer edge of the core layer and preferably no more than 1 mm beyond the outer edge of the core layer, i.e., the third edge region has an extension of no more than 5 mm and preferably no more than 1 mm. Thus, the second edge region 10 extends around the entire edge of the first cover sheet, so that the second edge region 10 encircles the core layer. The extension of the core layer 3 is shown with the dotted line 18 in FIG. 4. In FIG. 5 the second cover sheet 2 has an irregular shape. The shape of the first adhesive layer 4 and thus the shape of the core layer 3 may be achieved by providing the first cover sheet 1 with a mask (not shown) having the shape of the first edge region 7. After having applied the first adhesive layer 4 the mask is removed leaving the first edge region 7 uncovered by adhesive. The second cover sheet 2 is shown to have the same extension as the adhesive layer in FIG. 4. The largest extension of the first edge region 7 beyond the edge of the core layer 3 is denoted X in FIG. 5.

The extension of the core layer is shown as a rectangle in FIG. 4. It is, however, possible to provide the core layer shaped as a parallelogram.

In an alternative embodiment composite material comprises edge regions 28 extending outside the core layer 3 in small areas as is indicated by the dotted regions 28 in FIG. 4. The dotted regions 28 may be sufficient for attachment to a façade of a building (not shown) when the area defined by the core layer 3 defines the area of a façade element to be attached to a facade. The extension of the dotted regions 28 beyond the edge of the core layer 3 is denoted X in FIG. 4.

Figure 7:
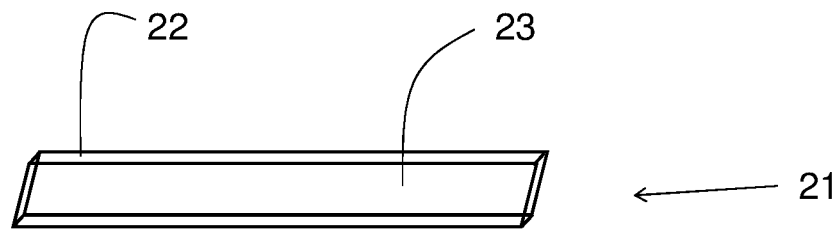
FIG. 7 shows a receptacle according to an embodiment of the invention.

FIG. 7 shows a receptacle 21 according to an embodiment of the invention. The receptacle 21 has been formed from a composite material 1 as shown in FIG. 4 and FIG. 6. The first edge region 7 has been reformed into a side wall 22 according to anyone of claims 2 to 5, wherein the second cover 2 sheet forms the inner bottom 23 of the receptacle 21 and the first edge region 7 forms the side wall 22 of the receptacle 21. In the embodiment shown in FIG. 7 the second cover sheet 2 is essentially flat. With the term flat is meant that the variation perpendicular to the surface of the second cover sheet 2 varies no more than 10% of the largest extension of the second cover sheet 2. The form of the wall 22 as shown in FIG. 7 will ensure that sufficient strength is provided through the shape of the wall 22. The strength of the inner bottom 23 of the receptacle 21 is provided by the sandwich arrangement of the first cover sheet 1, the second cover sheet 2, and the core layer 3.

Figure 8:
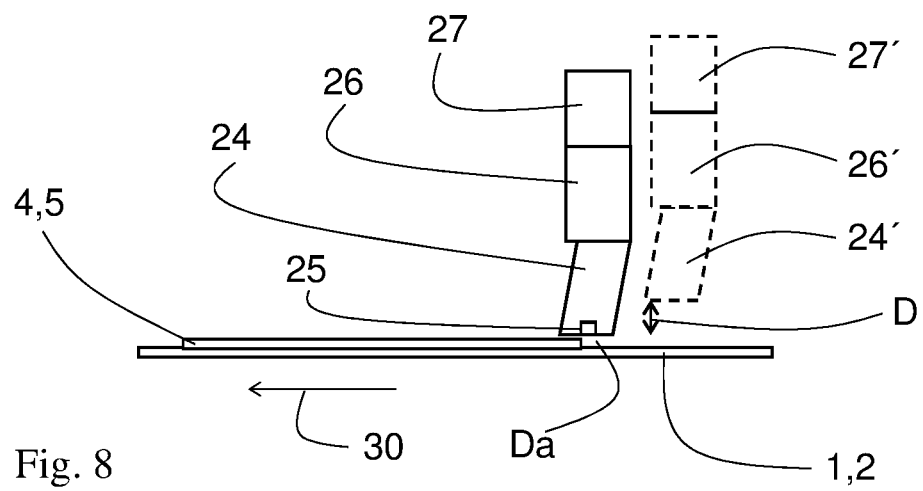
FIG. 8 illustrates schematically a method for applying an adhesive layer on a cover sheet.

FIG. 8 illustrates schematically a method for applying an adhesive layer 4, 5, on a cover sheet 1, 2. The method includes the use of a coating head 24 which operates at a distance Da from the first cover sheet 1 and the second cover sheet 2. The coating head 24 comprises a slot 25 through which the adhesive leaves the coating head and through which the adhesive is forced by applying a pressure on the adhesive inside the coating head 24. The adhesive can be said to be extruded from the coating head 24 through the slot 25 while moving the cover sheet 1, 2, along the direction 30. During application of the adhesive layer the adhesive forms a continuous stream from the slot to the cover sheet 1, 2. To provide an abrupt end of the adhesive layer the following steps are wherein the application of the adhesive is ended by the steps of moving the coating head away from the cover sheet a distance D during a time period T, and lowering the pressure P on the adhesive inside the coating head 24. The distance D is at least the thickness of the adhesive layer 4, 5 plus at least 5 mm, preferably at least 7 mm, and the time period T is less than 5 seconds, preferably less than 0.5 seconds. The pressure P is decreased below ambient pressure. This provides for an abrupt stop in the stream of adhesive. During the application of the adhesive on the cover sheet the distance Da between the coating head and the cover sheet 1, 2, is typically less than 0.2 mm plus the thickness of the adhesive layer 4, 5. The thickness of the adhesive layer 4, 5, is typically 0.15-0.3. The adhesive is stored in the reservoir 26. The pressure on the adhesive is provided by the pressure means 27. The dotted line shows the coating head 24', the reservoir 26', and the pressure means 27' in the position it has when application of adhesive has been terminated.

Figure 9:
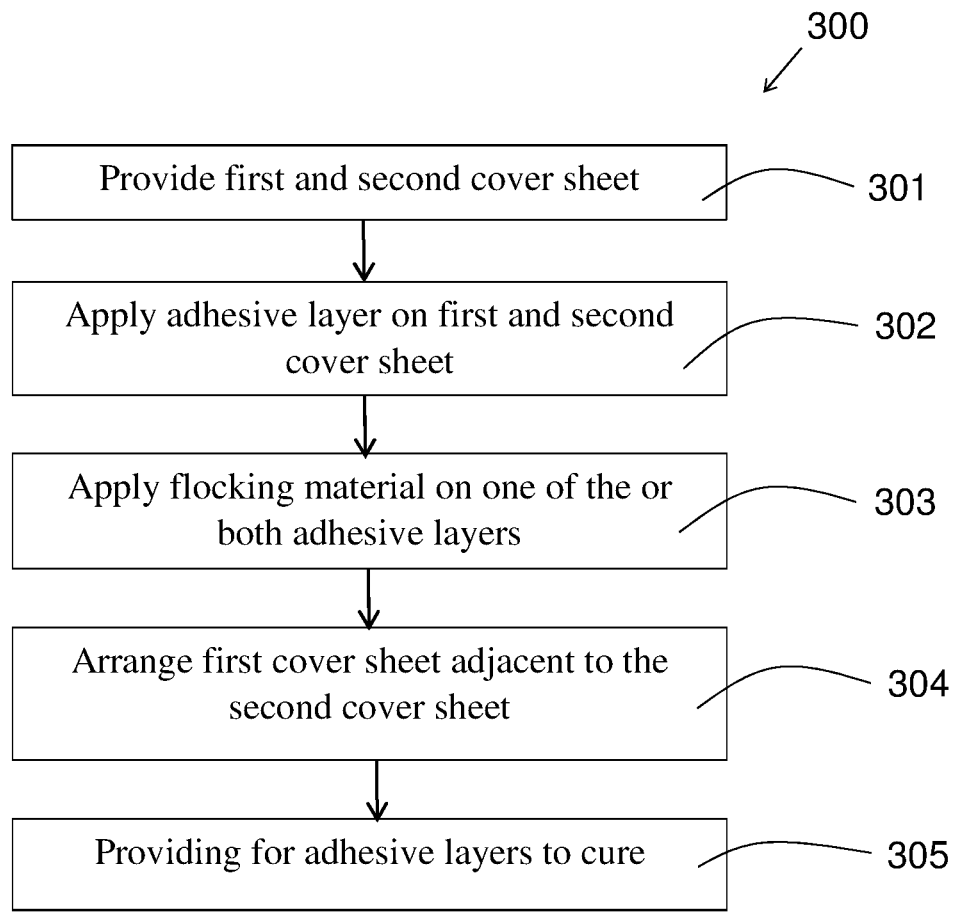
FIG. 9 is a flowchart of a method for production of a composite material.

FIG. 9 is a flowchart of a method 300 for production of a composite material 100 according to the embodiments of FIGS. 1, 2, 4, 5 and 6. The method comprises the steps of providing 301 a first cover sheet 1 and a second cover sheet 2, applying 302 a first adhesive layer 4 on the first cover sheet 1, applying a second adhesive layer 5 in contact with the second cover sheet 2, applying 303 a flocking material in the form of individual fibres on one of or both adhesive layers, arranging the first cover sheet adjacent to the second cover sheet with the first adhesive layer facing the second adhesive layer and with the fibres in contact with the first adhesive layer as well as the second adhesive layer, and providing 305 for the adhesive layers to cure. The first adhesive layer 4 and the second adhesive layer may be applied in many ways. It is, however, important to provide a well-defined core layer. The fibres 6 can be of many different materials, such as, e.g., metal or plastic. It is well known in the art how to apply a flocking material in the form of fibres 6 on a surface. The fibres 6 will adhere to the adhesive layer orientated essentially perpendicular to the surface. When the second cover sheet 2 is arranged adjacent to the first cover sheet 1 with the fibres 6 in contact with the first adhesive layer as well as the second adhesive layer 2, only curing of the adhesive layers is required to form the composite material 100. The fibres 6 will only adhere to the adhesive layers 4, 5. Thus, the extension of the core layer will be defined by the adhesive layers. It is much preferred to have the same extension of both adhesive layers. Primarily, it is important to avoid that the first adhesive layer is larger than the second adhesive layer as this would lead to the fibres only be adhered to the first cover sheet in some areas. In case fibres are applied to both adhesive layers it is important that they have essentially equal extensions.

The described embodiments of the invention may be modified in many ways without departing from the scope of the invention which is limited only by the appended claims.

The composite material may of course have other shapes than those that have been shown in the embodiments above.

The invention claimed is:

1. Composite material comprising
   a first cover sheet,
   a second cover sheet, and
   a core layer arranged between the first cover sheet and the second cover sheet, said core layer comprising:
   a first adhesive layer in contact with the first cover sheet,
   a second adhesive layer in contact with the second cover sheet, and
   a flocking material in the form of individual fibres which extend from the first adhesive layer to the second adhesive layer,
   characterized in that the first cover sheet has a larger extension than the core layer and comprises at least a first edge region which is free from the core layer,
   wherein the first edge region extends from an outer edge of the first cover sheet to an outer edge of the core layer, wherein the extension of the first edge region is at least 20 mm beyond the outer edge of the core layer, and wherein the second cover sheet extends no more than 5 mm beyond the outer edge of the core layer.

2. Composite material according to claim 1, wherein the extension of the first edge region beyond the outer edge of the core layer is at least 50 mm.

3. Composite material according to claim 1, wherein the first edge region extends around the entire outer edge of the first cover sheet, so that the first edge region encircles the core layer.

4. Composite material according to claim 1, wherein the second cover sheet extends no more than 1 mm beyond the outer edge of the core layer.

5. Receptacle formed from a composite material according to claim 1, wherein the second cover sheet forms an inner bottom of the receptacle and at least part of the first edge region form side walls of the receptacle.

6. Method for production of a composite material according to claim 1, comprising the steps providing a first cover sheet and a second cover sheet, applying a first adhesive layer on the first cover sheet and a second adhesive layer on the second cover sheet, applying a flocking material in the form of individual fibres on one of the adhesive layers, arranging the first cover sheet adjacent to the second cover sheet with the first adhesive layer facing the second adhesive layer and with the fibres in contact with the first adhesive layer as well as the second adhesive layer, providing for the adhesive layers to cure to form a core layer constituted by the first adhesive layer the second adhesive layer and the fibers, characterized in that the first cover sheet has a larger extension than the core layer and comprises at least a first edge region which is free from the core layer, wherein the first edge region extends from the outer edge of the first cover sheet to the core layer, wherein the extension of the first edge region beyond an outer edge of the core layer is at least 20 mm, and wherein the second cover sheet extends no more than 5 mm beyond the outer edge of the core layer.

7. Method according to claim 6, wherein the extension of the first edge region beyond the outer edge of the core layer is at least 50 mm.

8. Method according to claim 6, wherein the first adhesive layer is applied on the first cover sheet and the second adhesive layer is applied on the second cover sheet using a coating head which operates at a distance from the first cover sheet and the second cover sheet.

9. Method according to claim 8, wherein the coating head comprises a slot through which the adhesive leaves the coating head and through which the adhesive is forced by applying a pressure on the adhesive inside the coating head.

10. Method according to claim 9, wherein the application of the adhesive on the respective cover sheets is ended by the steps of moving the coating head away from the respective cover sheet, and lowering the pressure on the adhesive inside the coating head.

11. Method according to claim 10, wherein the coating head is moved away from the respective cover sheet at least 5 mm at a speed of at least 200 mm per minute.

12. Method according to claim 10, wherein the pressure on the adhesive inside the coating head is decreased below ambient pressure.

* * * * *